United States Patent
Oka

(10) Patent No.: US 7,102,639 B2
(45) Date of Patent: Sep. 5, 2006

(54) IMAGE PROCESSING APPARATUS, IMAGE PROCESSING METHOD, INFORMATION PROCESSING APPARATUS, INFORMATION PROCESSING SYSTEM, SEMICONDUCTOR DEVICE AND COMPUTER PROGRAM

(75) Inventor: Masaaki Oka, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 6 days.

(21) Appl. No.: 10/739,960

(22) Filed: Dec. 17, 2003

(65) Prior Publication Data

US 2004/0150646 A1    Aug. 5, 2004

(30) Foreign Application Priority Data

Dec. 20, 2002 (JP) .............................. 2002-371017
Dec. 15, 2003 (JP) .............................. 2003-416435

(51) Int. Cl.
*G06T 17/00* (2006.01)
*G06T 1/60* (2006.01)
*G06F 17/00* (2006.01)

(52) U.S. Cl. ........................ 345/428; 345/418; 345/530

(58) Field of Classification Search ................ 345/560, 345/502, 503, 428, 501, 530, 536, 418
See application file for complete search history.

(56) References Cited

U.S. PATENT DOCUMENTS

| | | | | | |
|---|---|---|---|---|---|
| 4,586,038 | A | * | 4/1986 | Sims et al. | 345/586 |
| 4,727,365 | A | * | 2/1988 | Bunker et al. | 345/427 |
| 5,103,499 | A | * | 4/1992 | Miner et al. | 345/503 |
| 6,003,045 | A | * | 12/1999 | Freitas et al. | 707/205 |
| 6,049,362 | A | * | 4/2000 | Butter et al. | 348/699 |
| 6,300,956 | B1 | | 10/2001 | Apodaca et al. | |
| 6,313,838 | B1 | * | 11/2001 | Deering | 345/420 |
| 6,359,929 | B1 | * | 3/2002 | Boon | 375/240.16 |
| 6,373,482 | B1 | * | 4/2002 | Migdel et al. | 345/419 |
| 6,806,876 | B1 | * | 10/2004 | Klein | 345/428 |

FOREIGN PATENT DOCUMENTS

WO    WO 99/23610    5/1999

OTHER PUBLICATIONS

Jihad El-Sana et al., "Integrating motion perception with view-dependent rendering for dynamic environments", Computers and Graphics, Oct. 2002, pp. 721-731, vol. 26, No. 5, Pergamon Press Ltd., Oxford, GB, XP004385829.

Patent Cooperation Treaty, "International Search Report", dated Sep. 13, 2004, for the corresponding Japanese Patent Application, 6 pages.

* cited by examiner

*Primary Examiner*—Ulka Chauhan
*Assistant Examiner*—Joni Hsu
(74) *Attorney, Agent, or Firm*—Fitch, Even, Tabin & Flannery

(57) ABSTRACT

An image processing apparatus includes an auxiliary storage device 19 stored first data of a given object image higher in LOD level, a main memory 11 stored second data of the given object image lower in the LOD level than the first data, a CPU 10, and a GPU 18. The CPU 10 calculates an apparent speed of the object image on a screen, and determines data to be used in the geometry processing of the object image to one of the first data and the second data in accordance with the apparent speed. The GPU 18 takes in the first data (or the second data) from the auxiliary storage device 19 (or the main memory 11) to conduct the rendering process in the case where the geometry processing is conducted by using the first data (or the second data).

6 Claims, 13 Drawing Sheets

|  | MAIN MEMORY | AUXILIARY STORAGE DEVICE |
|---|---|---|
| STORAGE CAPACITY | SMALL | LARGE |
| LATENCY | SMALL | LARGE |
| THROUGHPUT | HIGH | LOW |
FIG. 2
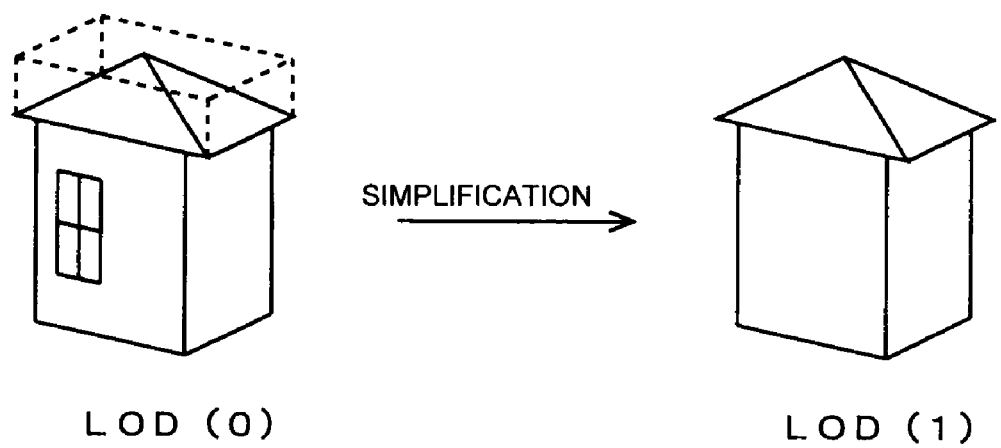
FIG. 3
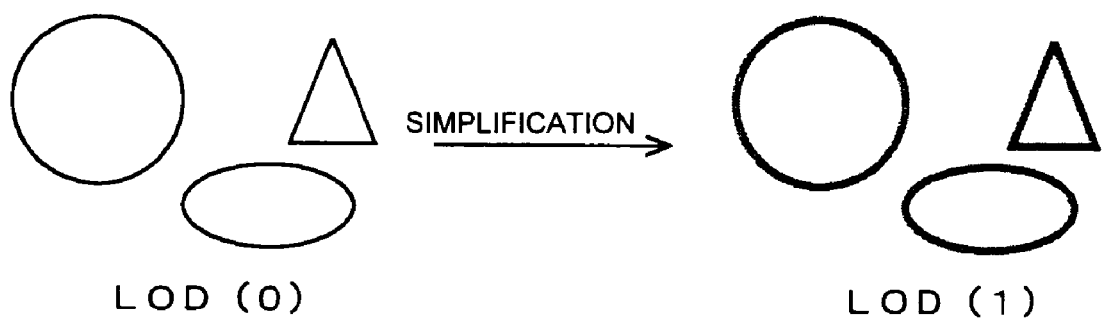
FIG. 4

SCREEN BEFORE ONE FRAME

PRESENT SCREEN

IMAGE PROCESSING APPARATUS, IMAGE PROCESSING METHOD, INFORMATION PROCESSING APPARATUS, INFORMATION PROCESSING SYSTEM, SEMICONDUCTOR DEVICE AND COMPUTER PROGRAM

CROSS REFERENCE TO RELATED APPLICATIONS

The present application claims priority from Japanese Application Nos. 2002-371017 filed Dec. 20, 2002 and 2003-416435 filed Dec. 15, 2003, the disclosures of which are hereby incorporated by reference herein.

BACKGROUND OF THE INVENTION

The present invention relates to a technique in which information generated in various details is outputted. In particular, the present invention relates to a technique in which an image that represents a virtual object within a virtual three-dimensional space (hereinafter referred to as "object image") is displayed on a given display device with various resolutions through a computer graphics.

In the field of the computer graphics, in order to obtain an image that approximates to a more real world, various processing is conducted. For example, in order to express a fact that an object is smaller and more difficult to watch as it is farther from a point of view in the real world, the resolution is more lowered as the object image is farther from the point of view such that the object image is so expressed as to be simplified. In order to simplify the object image as it is farther from the point of view, the amount of data of the object image to be used for processing can be reduced. In the present specification, the details of the object image is expressed by LOD (level of detail), and the detailed object image having the highest resolution is represented by LOD(O). The n-value of the LOD(n) (n is a natural numeral) becomes larger as the resolution becomes lower and the object image is more simplified. The amount of data becomes larger in order to display the object image in detail as the object image is higher in the LOD level, and the amount of data becomes lower as the LOD level is lower.

Also, in the field of an information processing device, there is a technique in which a plurality of information different in the details with respect to one event is prepared in advance, and one of those information is selected and outputted in accordance with those information. For example, there is a dictionary software in which simplified information such as a summary and detailed information are prepared for one word, and one of those two information can be selectively outputted. In this case, for example, the simplified information is information of LOD(1) and the detailed information is information of LOD(0).

SUMMARY OF THE INVENTION

The present invention has been made in view of the above circumstances, and therefore an object of the present invention is to provide an image processing technique that is suitable to output images different in resolution.

Another object of the present invention is to provide an information processing technique that is suitable to output information different in details.

In order to achieve the above objects, according to a first aspect of the present invention, there is provided an image processing apparatus that displays a moving image including an object image that represents a virtual object on a given display device, the image processing apparatus comprising: a first storage device in which first data represents the object image is stored; a second storage device in which second data represents the object image which is simplified more than the first data is stored; a first processor that conducts geometry processing of the object image by using one of the first data and the second data; and a second processor that generates one of images derived from the first data and images derived from the second data in accordance with results of the geometry processing. The first processor determines data to be used in the geometry processing to one of the first data and the second data according to an attribute of the object image, and the second processor takes in the first data from the first storage device to generate the image derived from the first data when the data to be used in the geometry processing which is determined by the first processor is the first data, and takes in the second data from the second storage device to generate the image derived from the second data when the data to be used in the geometry processing which is determined by the first processor is the second data.

The attribute of the object image is, for example, a depth distance from a view point of the object image, or an apparent speed of the object image on the screen.

In the case where the attribute of the object image is the depth distance from a view point of the object image, the first processor determines the data to be used in the geometry processing to the first data when the depth distance from the view point of the object image is shorter than a given distance, and determines the data to be used in the geometry processing to the second data when the depth distance from the view point of the object image is longer than a given distance.

In the case where the attribute of the object image is the apparent speed of the object image on the screen, the first processor determines the data to be used in the geometry processing to the first data when the apparent speed of the object image on the screen is lower than a given speed, and determines the data to be used in the geometry processing to the second data when the apparent speed of the object image on the screen is higher than the given speed. In this case, the first processor obtains, for example, a representative point that moves in conjunction with a motion of the object image as the apparent speed of the object image on the screen. The representative point is expressed by, for example, average coordinate values of the respective points that represent the object image.

When the attribute of the object image is an apparent speed of the object image on the screen and a depth distance from a view point of the object image, the data to be used in the geometry processing can be determined by the combination of those attributes. For example, the first processor determines the data to be used in the geometry processing to one of the first data and the second data on the basis of a result of comparing the apparent speed of the object image on the screen with a given speed and a result of comparing the depth distance of the object image from the viewpoint with the given distance.

When the second storage device can transfer the data to the second processor faster than the first storage device, the second processor generates the image derived from the second data before the image derived from the first data. Since the second data represents the object image simplified more than the first data, the amount of the second data may be lower than the amount of the first data. To achieve this, the second storage device may be lower in the storage capacity than the first storage device.

The image processing apparatus further comprises a simplifying device that simplifies the first data to generate the second data. The second data generated by the simplifying device is stored in the second storage device. In this structure, only the first data may be provided in advance. Also, only when the first data and the second data generated by the simplifying device are stored in the first storage device in advance, and the data to be used in the geometry processing is determined to the second data by the first processor, the second data may be transferred to the second storage device from the first storage device. In this structure, since only the second data of the object image necessary for display is stored in the second storage device, it is possible to reduce the storage capacitance necessary for the second storage device.

According to another aspect of the present invention, there is provided an image processing apparatus that displays a moving image including an object image representative of a virtual object on a given display device, the image processing apparatus comprising: a storage device in which first data that represents the object image and second data that represents the object image which is simplified more than the first data are stored; a first processor that conducts geometry processing on the object image in accordance with each of the first data and the second data; a second processor that generates an image derived from the first data and an image derived from the second data in accordance with the result of the geometry processing. The second processor displays the image on the given display device when the generation of the image derived from the first data has been completed at an updated timing of the moving image, and displays at least one of the image derived from the second data and the image derived from the first data of a past frame on the given display device when the generation of the image derived from the first data has not been completed at the updated timing of the moving image.

According to another aspect of the present invention, there is provided an image processing apparatus that displays a moving image including an object image representative of a virtual object on a given display device, the image processing apparatus comprising: a storage device in which first data that represents the object image and second data that represents the object image which is simplified more than the first data are stored; a first processor that calculates an apparent speed of the object image on a screen, and conducts geometry processing of the second data when the apparent speed is higher than the given speed, and conducts the geometry processing of the first data and the second data when the apparent speed is lower than the given speed; and a second processor that generates the image derived from the first data and/or the image derived from the second data in accordance with the result of the geometry processing, wherein the second processor displays the image derived from the second data on the given display device in the case where the apparent speed of the object image on the screen is higher than the given speed, and displays the image derived from the first data on the given display device when the generation of the image derived from the first data has been completed at the updated timing of the moving image and displays at least one of the image derived from the second data and the image derived from the first data of a past frame on the given display device when the generation of the image derived from the first data has not been completed at the updated timing of the moving image in the case where the apparent speed of the object image on the screen is lower than the given speed.

The storage device may comprise a first storage device in which the first data is stored, and a second storage device in which the second data is stored.

According to another aspect of the present invention, there is provided an image processing method which is executed by a apparatus that includes a first storage device in which first data representative of an object image of a virtual object and second data representative of the object image which is more simplified than the first data are stored, a second storage device, a first processor that conducts geometry processing of the first data and the second data, and a second processor that generates one of the image derived from the first data or the image derived from the second data in accordance with the result of the geometry processing conducted by the first processor, for displaying a moving image including the object image on a given display device, the image processing method comprising: deriving an apparent speed of the object image on a display screen by the first processor; conducting geometry processing of one of the first data and the second data in accordance with the apparent speed by the first processor; transferring the second data to the second storage device by the first processor when the geometry processing is conducted on the second data; taking in the first data from the first storage device to generate the image derived from the first data by the second processor when the geometry processing is conducted on the first data; and taking in the second data from the second storage device to generate the image derived from the first data by the second processor when the geometry processing is conducted on the second data.

According to another aspect of the present invention, there is provided an image processing method which is executed by a apparatus that includes a storage device in which first data representative of an object image of a virtual object and second data representative of the object image which is more simplified than the first data are stored, a first processor that conducts geometry processing of the first data and the second data, and a second processor that generates the image derived from the first data and the image derived from the second data in accordance with the result of the geometry processing conducted by the first processor, for displaying a moving image including the object image on a given display device, the image processing method comprising: obtaining an apparent speed of the object image on a screen by the first processor; and displaying the image derived from the second data by the second processor when the apparent speed of the object image on the screen which is obtained by the first processor is higher than a given speed, and displaying at least one of the image derived from the first data, the image derived from the second data, and the image derived from the first data of a past frame by the second processor when the apparent speed of the object image on the screen which is lower than the given speed.

According to another aspect of the present invention, there is provided an information processing apparatus, comprising: a first storage device in which first data that represents a given event is stored, a second storage device in which second data that represents the given event which is simplified more than the first data is stored, and an output unit that outputs the first data and the second data. The second storage device can transfer the data to the output device faster than the first storage device, and the output device takes in and outputs the second data from the second storage device, and takes in the first data from the first storage and outputs the first data instead of the second data.

According to another aspect of the present invention, there is provided an information processing system, comprising: a first processing device including a first storage device in which first data that represents a given event is stored; a second processing device including a second storage device in which second data that represents the given event which is simplified more than the first data is stored; and an output device that outputs the first data and the second data, wherein the output device, the first processing device and the second processing device are connected to each other via a network, wherein a data transfer speed between the first processing device and the second processing device is lower than a data transfer speed between the second processing device and the output device, and wherein the output device takes in and outputs the second data from the second processing device, and takes in the first data from the first processing device and outputs the first data instead of the second data.

In the information processing system thus structured, a measuring device for measuring the data transfer speed between the first processing device and the output device, and the data transfer speed between the second processing device and the output device may be connected to the network. With this structure, even in the case where a processing apparatus whose data transfer speed is unknown is on the network, an appropriate data output can be executed.

According to another aspect of the present invention, there is provide an information processing system, comprising: a first processing device including a first storage device in which first data that represents a given event and second data that represents the given event which is simplified more than the first data are stored; a second processing device including a second storage device in which the first data and the second data are stored; an output device that outputs the first data and the second data; and a measuring device that measures data transfer speed between the first processing device and the output device, and data transfer speed between the second processing device and the output device, wherein the first processing device, the second processing device, the output device and the measuring device are connected to each other via a network, and wherein the output device takes in and outputs the second data from one of the first processing device and the second processing device whose data transfer speed is judged to be higher than another processing device on the basis of a measurement result of the data transfer speed by the measuring device, and takes in the first data from another processing device and outputs the first data instead of the second data.

According to another aspect of the present invention, there is provided an semiconductor device equipped in a computer system that displays a moving image including an object image that represents a virtual object on a given display device, the semiconductor device cooperating with other parts of the computer system, the semiconductor device comprising: a first storage device in which first data that represents the object image is stored; a second storage device in which a second data that represents the object image which is simplified more than the first data is stored; a first processor that conducts geometry processing of the object image by using one of the first data and the second data; and a second processor that generates one of image derived from the first data and image derived from the second data in accordance with a result of the geometry processing, wherein the first processor determines the data to be used in the geometry processing to one of the first data and the second data according to an attribute of the object image, and wherein the second processor takes in the first data from the first storage device to generate the image derived from the first data when the data to be used in the geometry processing which is determined by the first processor is the first data, and takes in the second data from the second storage device to generate the image derived from the second data when the data to be used in the geometry processing which is the second data.

According to another aspect of the present invention, there is provided a semiconductor device equipped in a computer system that displays a moving image including an object image that represents a virtual object on a given display device, the semiconductor device cooperating with other parts of the computer system, the semiconductor device comprising: a storage device in which first data that represents the object image and second data that represents the object image which is simplified more than the first data are stored; a first processor that conducts geometry processing of the object image in accordance with each of the first data and the second data; and a second processor that generates an image derived from the first data and an image derived from the second data in accordance with a result of the geometry processing, wherein the second processor displays the image on the given display device when the generation of the image derived from the first data has been completed at an updated timing of the moving image, and displays at least one of the image derived from the second data and the image derived from the first data of a past frame on the given display when the generation of the image derived from the first data has not been completed at the updated timing of the moving image.

According to another aspect of the present invention, there is provided a semiconductor device equipped in a computer system and cooperating with other parts of the computer system, the semiconductor device comprising: a first storage device in which first data that represents a given event is stored; a second storage device in which second data that represents the given event which is simplified more than the first data is stored; and an output device that outputs the first data and the second data, wherein the second storage device can transfer the data to the output device faster than the first storage device, and wherein the output device takes in and outputs the second data from the second storage device, and takes in the first data from the first storage device and outputs the first data instead of the second data.

According to another aspect of the present invention, there is provided a computer program for forming, in a computer system that displays a moving image including an object image that represents a virtual object on a given display device, a first storage device in which first data that represents a object image is stored, a second storage device in which second data that represents the object image which is simplified more than the first data is stored, a first processor that conducts geometry processing of the object image by using one of the first data and the second data, and a second processor that generates one of the image derived from the first data and image derived from the second data in accordance with a result of the geometry processing, wherein the first processor determines the data to be used in the geometry processing to one of the first data and the second data in accordance to an attribute of the object image, and wherein the second processor takes in the first data from the first storage device to generate the image derived from the first data when the data to be used in the geometry processing which is determined by the first processor is the first data, and takes in the second data from the second storage device to generate the image derived from the second data when the data to be used in the geometry processing which is determined by the first processor is the second data.

According to another aspect of the present invention, there is provided a computer program for forming, in a computer system that displays a moving image including an object image that represents a virtual object on a given display device, a storage device in which first data that represents the object image and second data that represents the object image which is simplified more than the first data are stored, a first processor that conducts geometry processing of the object image in accordance with respect each of the first data and the second data, and a second processor that generates an image derived from the first data and an image derived from the second data in accordance with a result of the geometry processing, wherein the second processor displays the image on the given display device when the generation of the image derived from the first data has been completed at an updated timing of the moving image, and displays at least one of the image derived from the second data and the image derived from the first data of a past frame on the given display when the generation of the image derived from the first data has not been completed at the updated timing of the moving image.

According to another aspect of the present invention, there is provided a computer program for forming, in a computer system, a first storage device in which first data that represents a given event is stored, a second storage device in which second data that represents the given event which is simplified more than the first data is stored, and an output device that outputs one of the first data and the second data, wherein the second storage device can transfer the data to the output device faster than the first storage device, and wherein the output device takes in and outputs the second data from the second storage device, and takes in the first data from the first storage device and outputs the first data instead of the second data.

According to the present invention as described above, the information different in the details such as the images different in the resolution can be outputted with a high efficiency.

BRIEF DESCRIPTION OF THE DRAWINGS

These and other objects and advantages of this invention will become more fully apparent from the following detailed description taken with the accompanying drawings in which:

FIG. 2 is a table showing a relationship between a main memory and an auxiliary storage device;

FIG. 3 is a diagram for explaining the simplification of three-dimensional figure data;

FIG. 4 is a diagram for explaining the simplification of texture data;

DETAILED DESCRIPTION OF THE PREFERRED EMBODIMENTS

Figure 1:
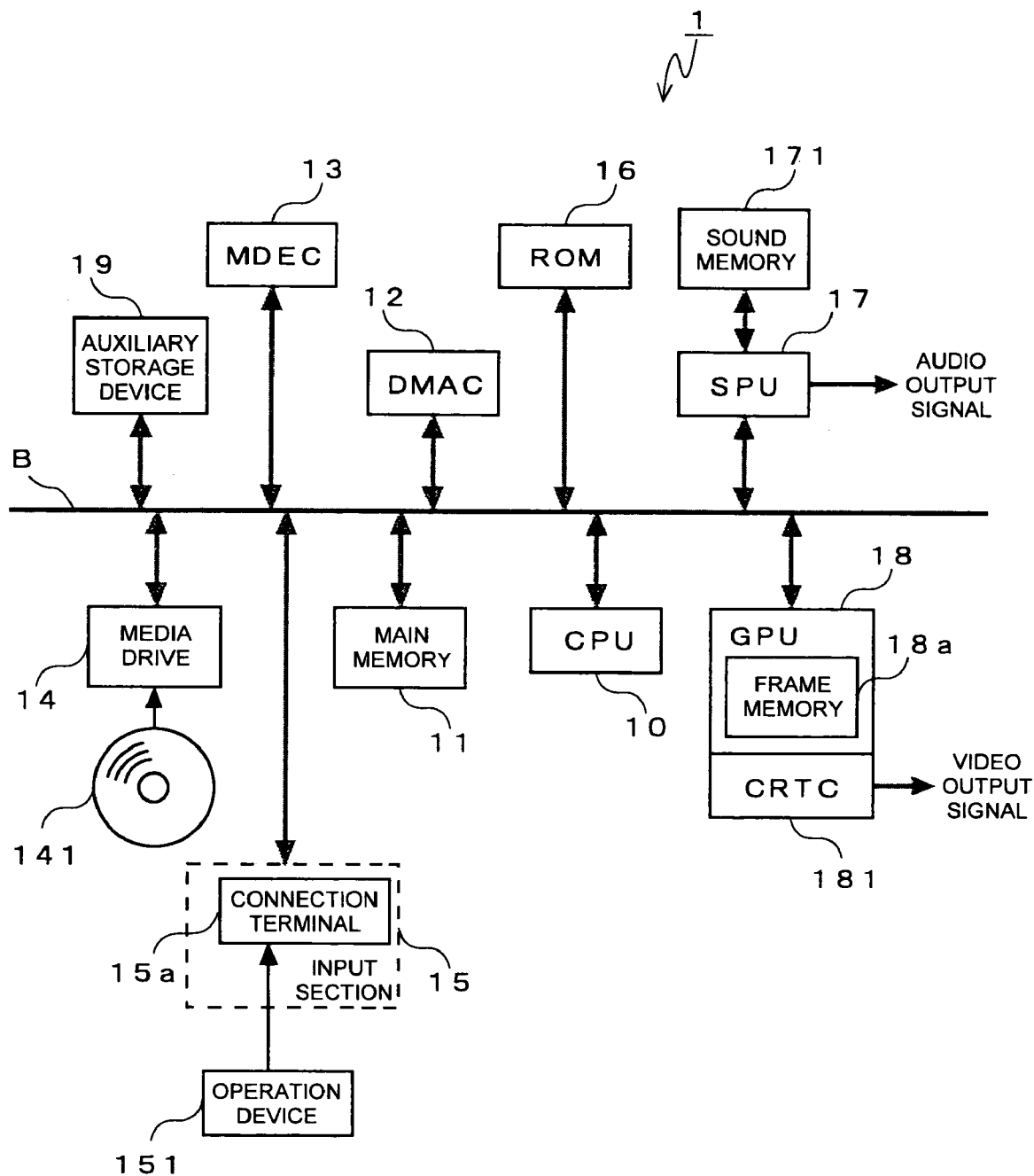
FIG. 1 is a structural diagram showing a hardware of an image processing apparatus.

Now, a description will be given in more detail of preferred embodiments of the present invention with reference to the accompanying drawings. FIG. 1 is a structural diagram showing a hardware of an image processing apparatus.

In the figure, an image processing apparatus 1 is so designed as to read and process program and data which have been recorded on a media 141 such as a CD-ROM or a DVD-ROM to display an image on a display device not shown and to output a sound from a speaker or the like. The image processing apparatus 1 thus structured is realized by, for example, a general-purpose computer having an image processing function, a video game device, an entertainment device or the like.

The image processing apparatus 1 includes a CPU (central processing unit) 10, a main memory 11 formed of a RAM, a DMAC (direct memory access controller) 12, an MPEG (moving picture experts group) decoder (MDEC) 13, a media drive 14 for loading a media 141, an input section 15, a ROM 16 in which program such as BIOS is recorded, a sound processing unit (hereinafter referred to as "SPU") 17 that reads sound data stored in a sound memory 171 and outputs the sound data as an audio output signal, a graphic processing unit (hereinafter referred to as "GPU") 18 having a frame memory 18a, and an auxiliary storage device 19. Those components are connected to each other through a bus B.

The GPU 18 is connected with a CRTC (CRT controller) 181. A video output signal is generated in conformity with standards such as an NTSC (national television standards committee) or a PAL (phase alternation by line), so as to be outputted from the CRTC 181 to a display device.

The CPU 10 is formed of a semiconductor device that reads a start program from the ROM 16, executes the start program and operates an operating system when the image processing apparatus 1 starts. Also, the CPU 10 controls the media drive 14, reads application program from the media 141 loaded in the media drive 14, and stores the application program in the main memory 11. The CPU 10 also reads three-dimensional graphic data (coordinate values of apexes of the polygon, etc.) made up of a plurality of basic graphics (polygon) and data necessary to generate an image such as texture data from the media 141, and stores those data in the auxiliary storage device 19. The three-dimensional graphic data represents an object image within the three-dimensional image.

The CPU 10 reads the program and the data from the media 141 and stores the program and the data in the auxiliary storage device 19, and also may take in the program and the data from an external device when the image processing apparatus 1 has a network interface for delivering the data with respect to the external device through a network.

The CPU 10 conducts geometry processing such as coordinate transformation or fluoroscopy transformation on the three-dimensional graphic data, and generates a displaylist including, as its contents, polygon definition information for the geometry processing (designations of the positions, colors, texture coordinates and fog colors of the apexes and the center of gravity of the polygon to be used, the LOD level of the three-dimensional graphic data and texture data to be used, etc.).

Also, the CPU 10 may simplify the three-dimensional graphic data and the texture data to generate the three-dimensional graphic data and the texture data which are low in the LOD level. The generated three-dimensional graphic data and texture data as generated which are low in the LOD level are stored in the auxiliary storage device 19.

The GPU 18 is formed of a semiconductor device that conducts a rendering process by using the displaylist, and renders the polygon in the frame memory 18*a* to generate an image. The GPU 18 conducts the rendering process by the three-dimensional graphic data and texture data of the LOD level which is designated by the displaylist. The frame memory 18*a* has a capacity that allows images of plural screens to be rendered.

The GPU 18 has a judging section that judges whether rendering of the image in the frame memory 18*a* has been completed, or not. With this structure, when the frame is updated, it is judged whether rendering of the image in the frame memory 18*a* has been completed, or not, and the image that has been completely rendered can be displayed on the display device.

The SPU 17 is formed of a semiconductor device that compounds sound data read from the sound memory 171 to generate an audio output signal. The DMAC 12 is formed of a semiconductor device that conducts DMA transfer control on the respective circuits that are connected to the bus B, and the MDEC 13 is formed of a semiconductor device that operates in parallel with the CPU 10 and decodes the data that has been encoded through the MPEG (moving picture experts group) system, the JPEG (joint photographic experts group) system, or the like.

The input section 15 is equipped with a connection terminal 15*a* to which an input signal is inputted from an operation device 151. The operation device 151 has a plurality of operation buttons, and an operator manipulates those operation buttons in various manners so as to move or deform the object image displayed on the display device. The operation device 151 may be structured by a keyboard, a mouse, a controller such as a video game device, or the like.

The auxiliary storage device 19 has a large-capacity storage device such as a hard disc drive. Also, the auxiliary storage device 19 may be structured by a memory on a network which is disposed in the exterior of the image processing apparatus 1 and can deliver the data with respect to the image processing apparatus 1. In the case where the memory on the network is used as the auxiliary storage device 19, the image processing apparatus 1 includes a network-interface for delivering the data with respect to the memory on the network.

The main memory 11 and the auxiliary storage device 19 store three-dimensional graphic data and texture data therein during image processing which is executed by the image processing apparatus 1, respectively. The three-dimensional graphic data and texture data which are stored in the main memory 11 and the auxiliary storage device 19 are employed during a rendering process that is executed by the GPU 18.

The main memory 11 and the auxiliary storage device 19 have the relationships of a storage capacity, a latency and a throughput as shown in FIG. 2.

That is, the storage capacity of the main memory 11 is smaller than that of the auxiliary storage device 19, the latency of the main memory 11 is smaller than that of the auxiliary storage device 19, and the throughput of the main memory 11 is higher than that of the auxiliary storage device 19.

For that reason, data of the low LOD level which is low in the amount of data and corresponds to a high frame rate is suitable to the three-dimensional graphic data and the texture data which are stored in the main memory 11. On the contrary, data of the high LOD level which is high in the amount of data and corresponds to a low frame rate is suitable to the three-dimensional graphic data and the texture data which are stored in the auxiliary storage device 19.

The three-dimensional graphic data is supplied from the media 141, and in the case where LOD(0) to LOD(n) of the same image are prepared in the media 141 in advance, those LOD levels are stored in the auxiliary storage device 19. In the case where only the three-dimensional graphic data of LOD(0) that represents the most details is prepared, the CPU 10 simplifies the three-dimensional graphic data and generates the three-dimensional graphic data of another LOD level. FIG. 3 is a diagram for explaining the simplification of three-dimensional figure data.

In FIG. 3, the object image expresses a house. The object image is made up of an outer wall portion, a roof portion and a window portion.

The simplification of the three-dimensional graphic data is executed, for example, by omitting the respective portions in accordance with their sizes. The sizes of the respective portions are determined in accordance with the volume of the outline. The volume of the outline is a cuboid volume which can be formed by the maximum and the minimum of the apex of each the portion in the respective directions of X, Y and Z. In the example of FIG. 3, the cuboid of the roof is represented by dotted lines. It is determined whether the portion should be omitted, or not, depending on whether the volume of the outline being larger than a given value, or not.

In FIG. 3, the window portion is omitted by simplification. The three-dimensional graphic data of LOD(1) expresses the house from which the window is omitted.

In the case of a two-dimensional graphic, the simplification can be conducted in accordance with an area.

As in the three-dimensional graphic data, the texture data read from the media 141 is simplified and generated by the CPU 10 in the case where the texture data of the respective LOD levels is not prepared in the media 141.

FIG. 4 is a diagram for explaining the simplification of the texture data.

The simplification of the texture data is conducted by, for example, allowing the texture data to pass through a two-dimensional low pass filter. The band of the texture data is narrowed by the low pass filter to reduce the amount of data. In an example shown in FIG. 4, the textures of a circle, an ellipse and a triangle of LOD(0) are simplified by the low pass filter, and the circle, the ellipse and the triangle of LOD(1) whose outline portions are unclear are generated. As the band of the texture data narrowed by the low pass filter is larger, the outline portion becomes unclear, and the amount of data is reduced.

Figure 5:
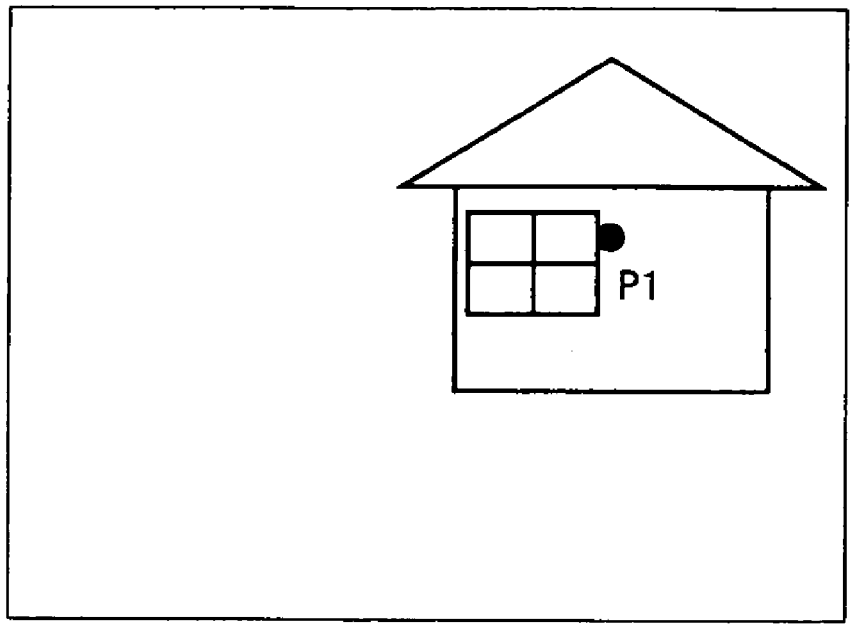
FIG. 5 is a diagram for explaining an apparent speed of an object image on a screen.
Figure 5:
Figure 5:
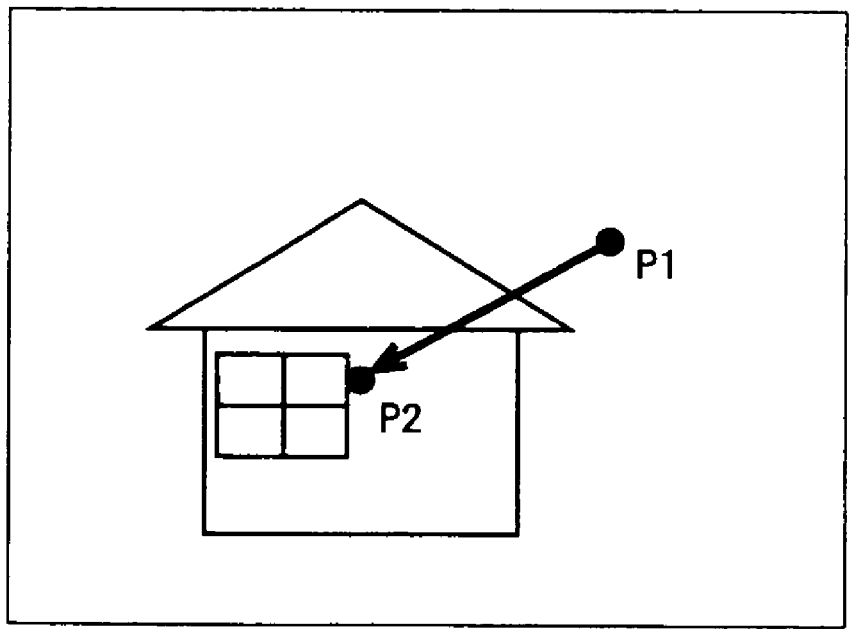

Which LOD level of the three dimensional graphic data and the texture data to be used in the rendering process can be determined, for example, in accordance with the apparent speed of the object image on the screen. The apparent speed of the object image on the screen is obtained, for example, in the geometry processing. FIG. 5 is a diagram for explaining a manner of obtaining the apparent speed.

The apparent speed of the object image on the screen may be found by obtaining and averaging the respective apexes of the object image. In this example, one representative point such as a center point (for example, the average value of the respective apex coordinates) of the object image is decided and obtained. Since the apparent speed of one point on the screen is obtained, the amount of processing is reduced more than a case in which the apparent speeds of the respective apexes of the object image are obtained.

The geometry processing is conducted on the representative point, thereby being capable of obtaining a position of the representative point on the screen. The apparent speed of the object image on the screen can be obtained, for example, from the position of the representative point on the present screen and the position of the representative point on a screen before one frame.

In an example shown in FIG. 5, the amount of movement of the representative point on the screen is obtained by calculating a difference between a position P2 of the representative point of the object image that expresses the house in the present frame and a position P1 of the representative point of the object image that expresses the house before one frame. The amount of movement enables the apparent speed of the object image on the screen to be obtained.

The CPU 10 determines the LOD level of the three-dimensional graphic data to be used in accordance with the apparent speed of the object image on the screen. For example, in the case where the apparent speed is higher than a given speed, since rendering must be conducted at a high speed, the CPU 10 determines the LOD level of the three-dimensional graphic data to be used to LOD(1) whose amount of data is small. Since the object moves at a high speed, even if the object image that is low in the LOD level is displayed, there is no uncomfortable feeling. In the case where the apparent speed is lower than the given speed, since rendering must be conducted in detail, the CPU 10 determines the LOD level of the three-dimensional graphic data to be used to LOD(0) whose amount of data is large.

The LOD level of the texture data is determined in accordance with the LOD level of the three-dimensional graphic data to which the texture data is mapped.

The three-dimensional graphic data and the texture data for displaying the object image whose LOD level has been determined to LOD(1) are transferred to the main memory 11 from the auxiliary storage device 19 before the rendering process.

Figure 6:
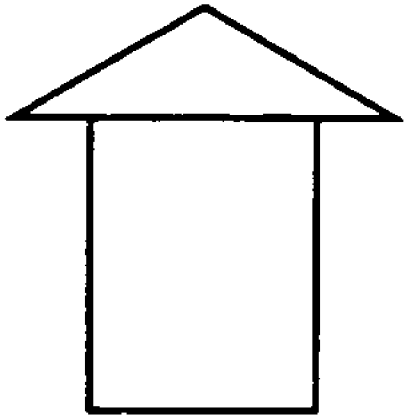
FIG. 6 is an exemplary diagram showing three-dimensional figure data and texture data which are stored in the main memory and the auxiliary storage device.

FIG. 6 is an example of an image derived from the three-dimensional graphic data (the object image of the house) and the texture data (circle) which are stored in the main memory 11 and the auxiliary storage device 19. The three-dimensional graphic data of LOD(1) and the texture data of LOD(1) are stored in the main memory 11, and the three-dimensional graphic data of LOD(0) and the texture data of LOD(0) are stored in the auxiliary storage device 19.

As described above, the main memory 11 is higher in the throughput than the auxiliary storage device 19. Also, the three-dimensional graphic data and the texture data which are stored in the main memory 11 are smaller in the amount of data than those that are stored in the auxiliary storage device 19. For that reason, a period of time necessary to transfer the three-dimensional graphic data and the texture data to the GPU 18 from the main memory 11 becomes shorter than that from the auxiliary storage device 19 to the GPU 18.

Figure 7:
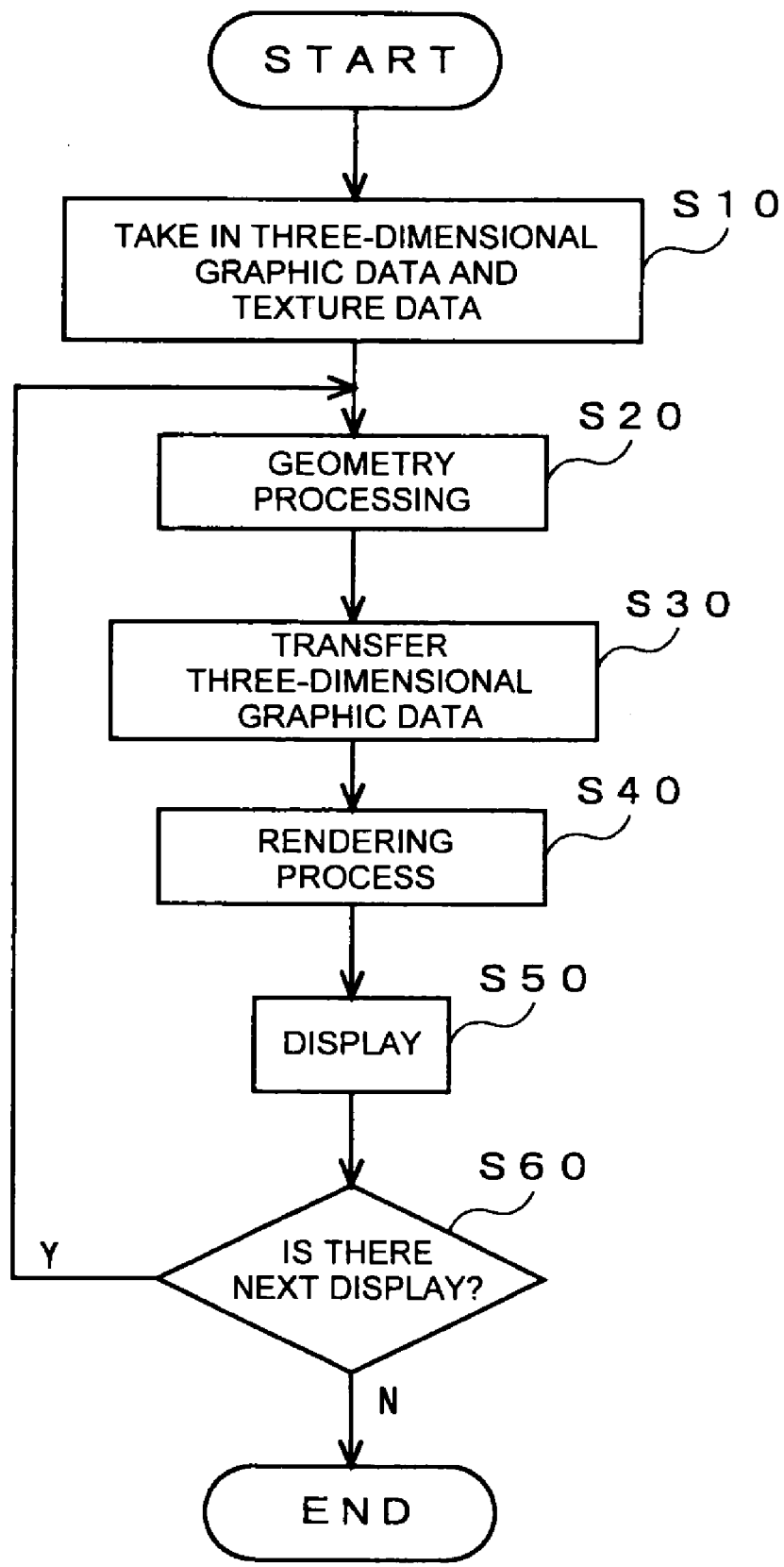
FIG. 7 is a flowchart showing image processing.

The image processing conducted on the three-dimensional image including the object image by the above-mentioned image processing apparatus 1 will be described with reference to a flowchart shown in FIG. 7.

The image processing apparatus 1 first takes in the three-dimensional graphic data related to the object image and the texture data related to the texture that adheres to a polygon or the like in rendering from the media 141 due to the media drive 14, and writes the three-dimensional graphic data and the texture data in the auxiliary storage device 19 (Step S10).

In the case where two three-dimensional graphic data of LOD(0) and LOD(1) for one object image are prepared in the media 14, all of those data is taken in and written in the auxiliary storage device 19. In the case where only the three-dimensional graphic data of LOD(0) for one object image is prepared, the CPU 10 simplifies the three-dimensional graphic data to prepare the three-dimensional graphic data of LOD(1) as described above, and writes the data in the auxiliary storage device 19.

Similarly, in the case where only the texture data of LOD(0) for one texture is prepared in the media 141, the CPU 10 simplifies the textured data and prepares the texture data of LOD(1), and writes the texture data in the auxiliary storage device 19 as described above.

Subsequently, the image processing apparatus 1 conducts the geometry processing on the respective object images within the three-dimensional image through the CPU 10 (Step S20). In conducting the geometry processing, the apparent speeds of the respective object images on the screen are calculated as described above. The CPU 10 determines the LOD levels of the three-dimensional graphic data and the texture data to be used in the geometry processing in accordance with the apparent speed thus calculated. Then, the CPU 10 conducts the geometry processing on the three-dimensional graphic data of the LOD level. The CPU 10 may conduct the geometry processing on both of the three-dimensional graphic data of LOD(0) and LOD(l) when the apparent speed of the object image on the screen is lower than a given speed.

The CPU 10 generates a displaylist through the geometry processing and sends the displaylist to the GPU 18. In the case where the geometry processing is conducted on both of the three-dimensional graphic data of LOD(0) and LOD(l), two displaylists are generated for one object image and then transmitted to the GPU 18.

The CPU 10 transfers the three-dimensional graphic data of LOD(1) and the texture data of LOD(1) related to the object image to be subjected to the geometry processing to the main memory 11 from the auxiliary storage device 19 (Step S30).

In the case where the storage capacity of the main memory 11 is not fully occupied, all of the three-dimensional graphic data of LOD(1) and the texture data of LOD(1) may be transferred to the main memory 11 from the auxiliary storage device 19 in advance. Alternatively, the three-dimensional graphic data of LOD(1) and the texture data of LOD(1) may be transferred directly to the main memory 11 from the media 141.

The GPU 18 conducts the rendering process on the basis of the displaylist transmitted from the CPU 10 (Step S40). The GPU 18 reads the three-dimensional graphic data and the texture data to be used in the rendering process from the main memory 11 or the auxiliary storage device 19 on the basis of the LOD level indicated in the displaylist and uses those data. As a result of the rendering process, an image is rendered in the frame memory 18a. The GPU 18 selects an image that is judged by a built-in judging section to be completely rendered. The CRTC 181 converts the rendered image in the frame memory 18a which is selected by the GPU 18 into a video signal and outputs the video signal, and displays the image on the display device (Step S50). This process is repeated until the moving image has been completed, or until an end signal is inputted from the operation device 151 (Step S60).

Figure 8:
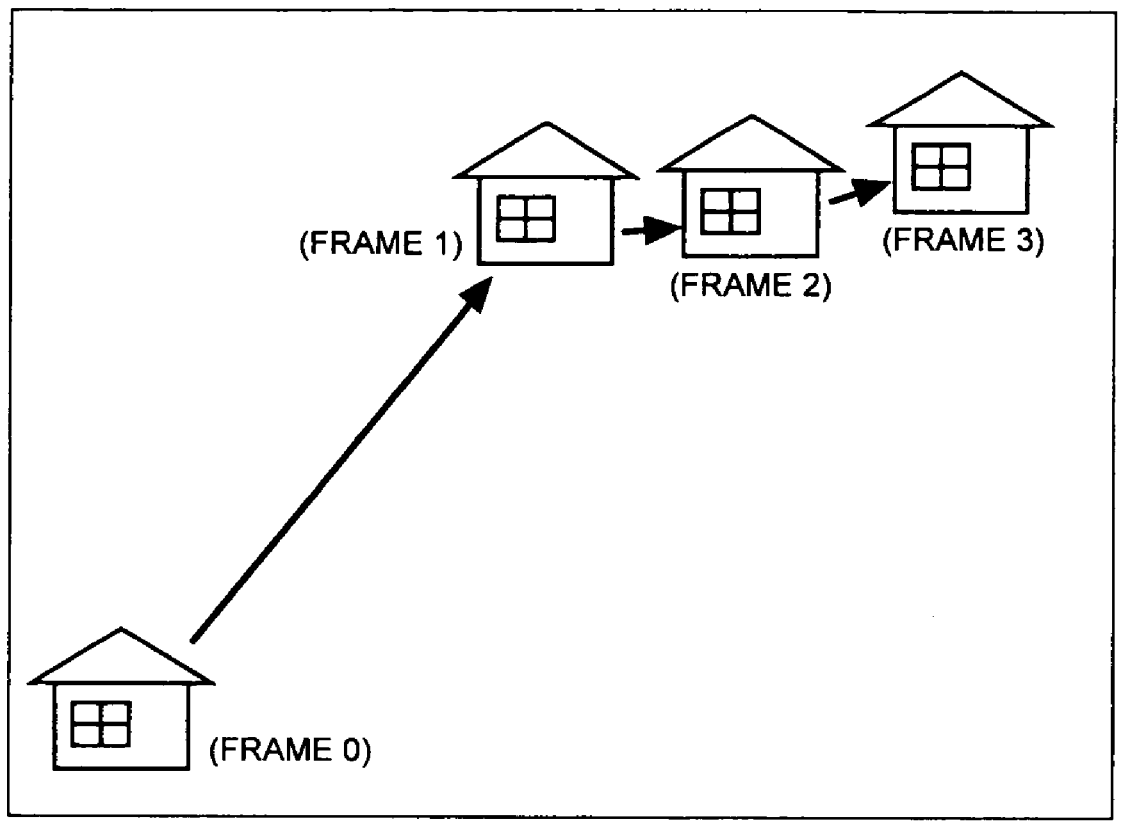
FIG. 8 is a diagram showing one example of a display.

The geometry processing in Step S20 and the rendering process in Step S40 will be described in detail with reference to an example in which a moving image is rendered as shown in FIG. 8.

FIG. 8 shows a condition in which moving images for four frames are displayed in a superimposed manner, and the object image of a house at the lower left of the screen in a first frame (frame 0) moves to the upper middle of the screen in its subsequent frame (frame 1), to the upper right of the screen in its subsequent frame (frame 2), and to the further upper right of the screen in a final frame (frame 3).

The house moves on the screen at a speed higher than the given speed from the frame 0 to the frame 1, and move on the screen at a speed lower than the given speed from the frame 1 to the frame 2, and from the frame 2 to the frame 3.

Figure 9:
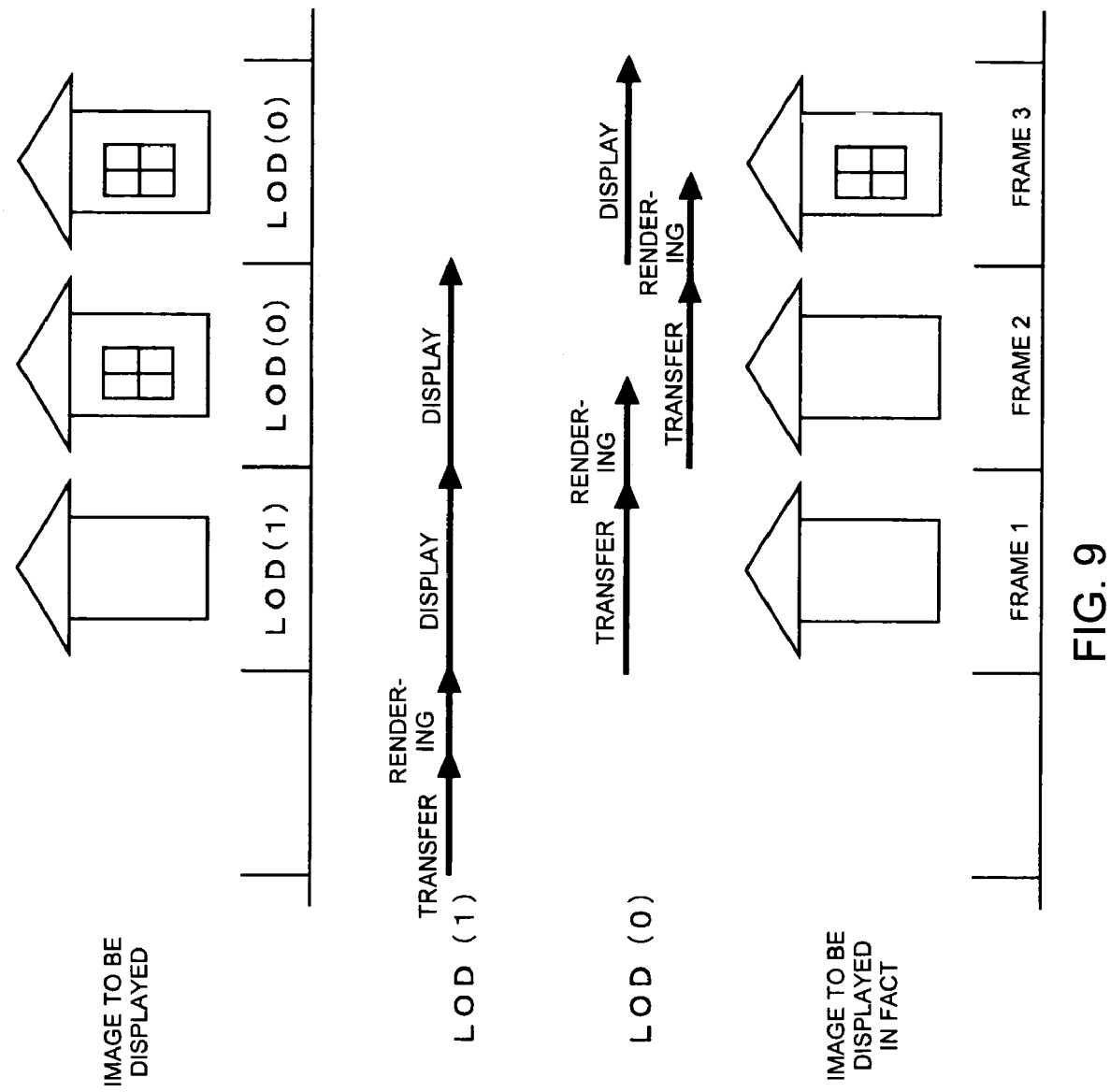
FIG. 9 is a diagram showing another example of a display.

FIG. 9 shows a case in which a period of time required for the rendering process conducted on the three-dimensional graphic data of LOD(0), that is, a period of time required since the three-dimensional graphic data of LOD(0) is transferred from the auxiliary storage device 19 to the GPU 18 until the object image is rendered in the frame memory 18a is longer than the display period of time for one frame, and the three-dimensional graphic data used in the rendering process is determined to one of LOD(0) and LOD(1). A period of time required for the rendering process conducted on the three-dimensional graphic data of LOD(1) is shorter than the display period of time for one frame.

The CPU 10 obtains the apparent speed of the object image on the screen for each of the frames to determine the LOD level of the three-dimensional graphic data rendered in the rendering process. In an example of FIG. 8, since the apparent speed of the object image on the screen in the frame 1 is higher than the given speed, the CPU 10 determines the three-dimensional graphic data of the object image to LOD(1). Since the apparent speed of the object image on the screen in the frames 2 and 3 is lower than the given speed, the CPU 10 determines the three-dimensional graphic data of the object image to LOD(0). That is, the LOD level of the object image to be displayed becomes LOD(1), LOD(0) and LOD(0) in the stated order from the frame 1.

The displaylist of the three-dimensional graphic data of LOD(L) is generated in the frame 1, and the displaylist of the three-dimensional graphic data of LOD(0) is generated in the frames 2 and 3.

The GPU 18 reads the three-dimensional graphic data of LOD(1) from the main memory 11 to render the object image on the basis of the displaylist for the frame 1. The transfer process to the rendering process of the three-dimensional graphic data of LOD(1) have been completed within the display period of time for one frame, the image derived from the three-dimensional graphic data of LOD(L) is displayed in the frame 1.

Then, the GPU 18 reads the three-dimensional graphic data of LOD(0) from the auxiliary storage device 19 to render the object image on the basis of the displaylist for the frame 2. The transfer process to the rendering process of the three-dimensional graphic data of LOD(0) have not been completed within the display period of time for one frame. For that reason, the GPU 18 cannot display the image for the frame 2. In this case, the GPU 18 again displays the image for the frame 1 which has been displayed in advance.

Then, the GPU 18 reads the three-dimensional graphic data of LOD(0) from the auxiliary storage device 19 to render the object image on the basis of the displaylist for the frame 3. The transfer process to the rendering process of the three-dimensional graphic data of LOD(0) have not been completed within the display period of time for one frame. For that reason, the GPU 18 cannot display the image for the frame 3. Since the rendering of the image for the frame 2 has been completed at the display timing of the frame 3, the GPU 18 displays the image for the frame 2.

In this way, the LOD level of the object image that is displayed in fact becomes LOD(1), LOD(1) and LOD(0) in the stated order from the frame 1. Although the image of the frame 2 is different from that to be displayed, there arises no problem because the frame 1 is also the image of LOD(1). Also, although the image to be displayed in the frame 2 is displayed in the frame 3, there is no uncomfortable feeling because the amount of movement of the object image on the screen is relatively small in the frame 2 and the frame 3.

Figure 10:
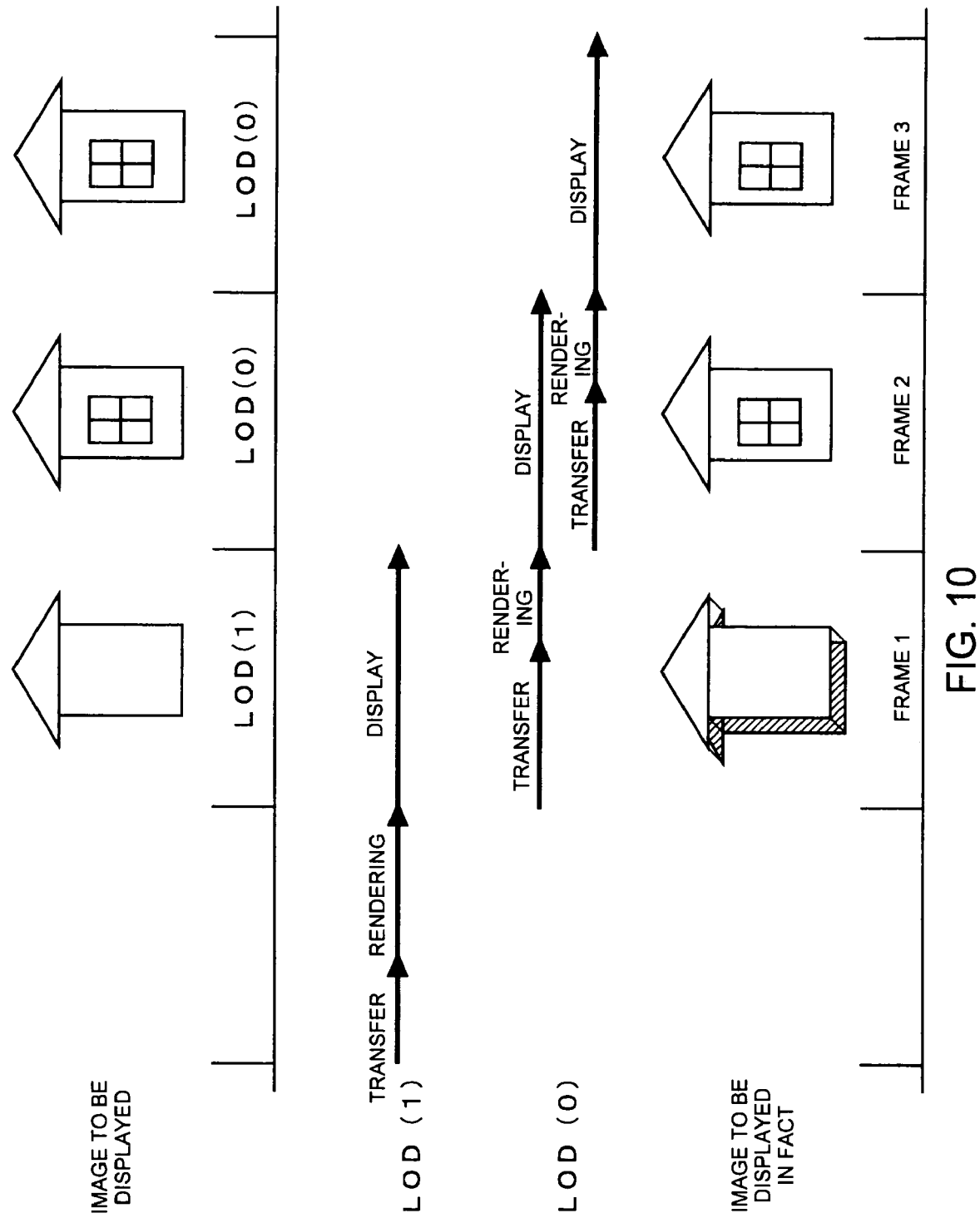
FIG. 10 is a diagram showing still another example of a display.

FIG. 10 shows a case in which a period of time required for the rendering process conducted on the three-dimensional graphic data of LOD(0) is shorter than the display period of time for one frame, and the three-dimensional graphic data used in the rendering process is determined to one of LOD(0) and LOD(1). A period of time required for the rendering process conducted on the three-dimensional graphic data of LOD(L) is shorter than a period of time required for the rendering process conducted on the three-dimensional graphic data of LOD(0).

The geometry processing conducted by the CPU 10 is identical with that described with reference to FIG. 9. The LOD level of the object image to be displayed is LOD(1), LOD(0) and LOD(0) in the stated order from the frame 1.

The GPU 18 reads the three-dimensional graphic data of LOD(1) from the main memory 11 to render the object image on the basis of the displaylist for the frame 1. Since the three-dimensional graphic data of LOD(1) has a sufficient time for the transfer process to the rendering process with respect to the display period of time for one frame, if a plurality of frames are written in the superimposed manner to effect a motion blur, the sense of speed of the object image in the image of the frame 1 can be expressed.

Then, the GPU 18 reads the three-dimensional graphic data of LOD(0) from the auxiliary storage device 19 to render the object image on the basis of the displaylist for the frame 2. The transfer process to the rendering process of the three-dimensional graphic data of LOD(0) have been completed within the display period of time for one frame, the image derived from the three-dimensional graphic data of LOD(0) is displayed in the frame 2.

Then, The GPU 18 reads the three-dimensional graphic data of LOD(0) from the auxiliary storage device 19 to render the object image on the basis of the displaylist for the frame 3. The transfer process to the rendering process of the three-dimensional graphic data of LOD(0) have been completed within the display period of time for one frame, the image derived from the three-dimensional graphic data of LOD(0) is displayed in the frame 3.

In this way, the LOD level of the object image that is displayed in fact becomes LOD(1), LOD(0) and LOD(0) in the stated order from the frame 1. The object image in the frame 1 expresses the sense of speed due to the motion blur, and can be displayed as in the conventional one even if the frame rate is low.

Figure 11:
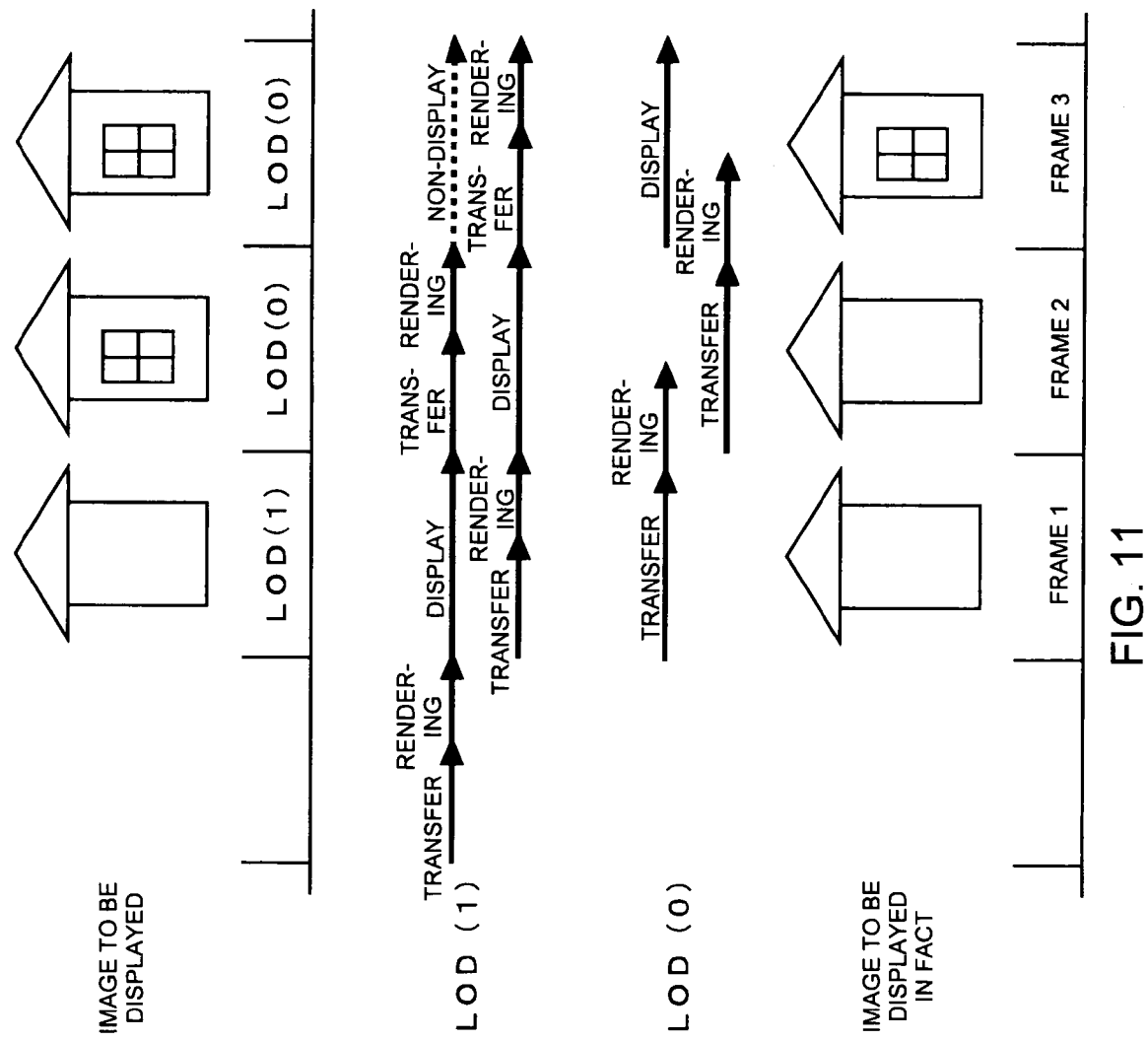
FIG. 11 is a diagram showing yet still another example of a display.

FIG. 11 shows a case in which a period of time required for the rendering process conducted on the three-dimensional graphic data of LOD(0) is longer than the display period of time for one frame, and the three-dimensional graphic data of LOD(0) and LOD(1) related to one low-speed object image is transferred to the GPU 18 in parallel in the rendering process. A period of time required for the rendering process conducted on the three-dimensional graphic data of LOD(1) is shorter than the display period of time for one frame.

The CPU 10 obtains the apparent speed of the object image on the screen for each of the frames through the geometry processing. The CPU 10 generates a displaylist of only the three-dimensional graphic data of LOD(1) when the apparent speed of the object image on the screen is higher than a given speed, and generates the displaylists of the respective three-dimensional graphic data of LOD(0) and LOD(1) when the apparent speed of the object image on the screen is lower than the given speed.

In the example of FIG. 8, because the apparent speed of the object image on the screen in the frame 1 is higher than the given speed, the displaylist of the three-dimensional graphic data of LOD(1) is generated. Because the apparent speed of the object image on the screen in the frames 2 and 3 is lower than the given speed, the displaylists of the respective three-dimensional graphic data of LOD(0) and LOD(1) are generated. The LOD level of the object image to be displayed is LOD(1), LOD(0) and LOD(0) in the stated order from the frame 1.

The GPU 18 reads the three-dimensional graphic data of LOD(1) from the main memory 11 to render the object image on the basis of the displaylist for the frame 1. Since the transfer process to the rendering process of the three-dimensional graphic data of LOD(1) have been completed within the display period of time for one frame, the three-dimensional graphic data of LOD(L) is displayed in the frame 1.

Then, the GPU 18 reads the three-dimensional graphic data of LOD(1) from the main memory 11 to render the object image, and also reads the three-dimensional graphic data of LOD(0) from the auxiliary storage device 19 to render the object image, on the basis of the two displaylists for the frame 2. The rendering process of the three-dimensional graphic data of LOD(1) has been completed within the display period of time for one frame, but the rendering process of the three-dimensional graphic data of LOD(0) has not been completed within the display period of time for one frame. The image derived from the three-dimensional graphic data of LOD(0) should be naturally displayed in the frame 2, but cannot be displayed because the rendering process has not been completed. For that reason, the GPU 18 displays the image derived from the three-dimensional graphic data of LOD(1) whose rendering has been completed.

Then, the GPU 18 reads the three-dimensional graphic data of LOD(1) from the main memory 11 to render the object image, and also reads the three-dimensional graphic data of LOD(0) from the auxiliary storage device 19 to render the object image, on the basis of the two displaylists for the frame 3. The rendering process of the three-dimensional graphic data of LOD(1) has been completed within the display period of time for one frame, but the rendering process of the three-dimensional graphic data of LOD(0) has not been completed within the display period of time for one frame. Because the rendering process of the image to be naturally displayed in the frame 3 has not been completed, the GPU 18 displays at least one of the image derived from the three-dimensional graphic data of LOD(1) for the frame 3 and the image derived from the three-dimensional graphic data of LOD(0) for the frame 2, which have been already rendered.

case of the image derived from the three-dimensional graphic data of LOD (1) for the frame 3, the position of the object image on the screen is accurate, but the simplified object image is displayed.

In case of the image derived from the three-dimensional graphic data of LOD (0) for the frame 2, the detailed object image is displayed, but the position of the object image on the screen is inaccurate. However, there arises no problem because the apparent speed of the object image on the screen is lower.

Also, the image derived from the three-dimensional graphic data of LOD(1) for the frame 3 and the image derived from the three-dimensional graphic data of LOD(0) for the frame 2 may be written in the superimposed manner.

The LOD level of the object image to be displayed in fact is LOD(1), LOD(1) and LOD(0) or LOD(1), or LOD(1), LOD(1) and LOD(0) and LOD(1) in the stated order from the frame 1.

Figure 12:
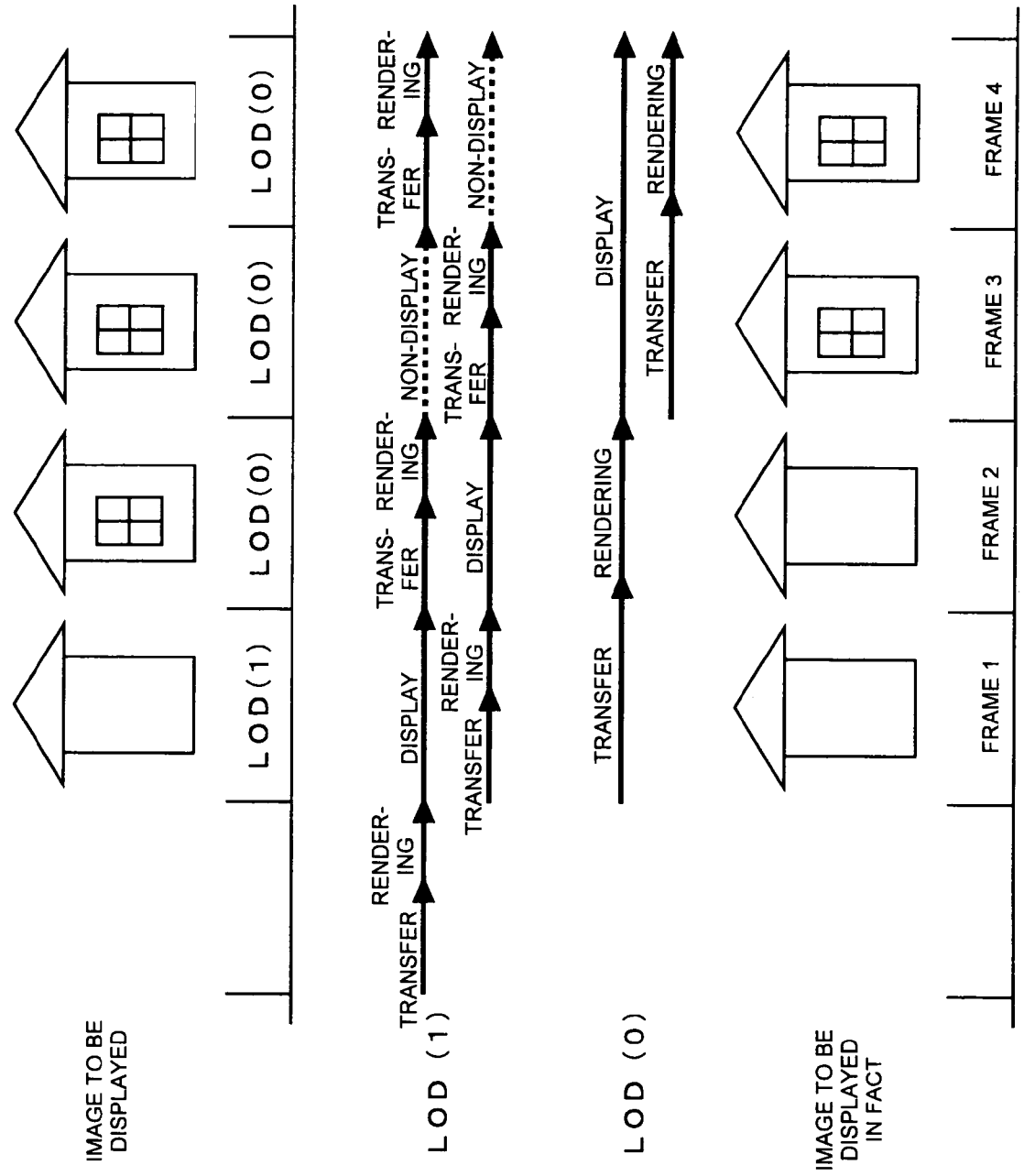
FIG. 12 is a diagram showing yet still another example of a display.

FIG. 12 shows a case in which a period of time required for the rendering process conducted on the three-dimensional graphic data of LOD(0) is equal to or longer than the display period of time for one frame and equal to or lower than the display period of time for two frames, and the three-dimensional graphic data of LOD(0) and LOD(1) related to one low-speed object image is transferred to the GPU 18 in parallel in the rendering process. A period of time required for the rendering process conducted on the three-dimensional graphic data of LOD(1) is shorter than the display period of time for one frame. In FIG. 12, the image in the frame 4 which is not shown in FIG. 8 is set. The object image in the frame 4 moves at a speed lower than a given speed as in the frames 2 and 3.

The CPU 10 obtains the apparent speed of the object image on the screen for each of the frames through the geometry processing. The CPU 10 generates a displaylist of only the three-dimensional graphic data of LOD(1) when the apparent speed of the object image on the screen is higher than a given speed, and generates the displaylists of the respective three-dimensional graphic data of LOD(0) and LOD(1) when the apparent speed of the object image on the screen is lower than the given speed.

In the example of FIG. 8, because the apparent speed of the object image on the screen in the frame 1 is higher than the given speed, the displaylist of the three-dimensional graphic data of LOD(1) is generated. Because the apparent speed of the object image on the screen in the frames 2 and 3 is lower than the given speed, the displaylists of the respective three-dimensional graphic data of LOD(0) and LOD(1) are generated. Similarly, because the apparent speed of the object image on the screen in the frame 4 is lower than the given speed, the displaylists of the respective three-dimensional graphic data of LOD(0) and LOD(1) are generated. The LOD level of the object image to be displayed is LOD(1), LOD(0), LOD(0) and LOD(0) in the stated order from the frame 1.

The GPU 18 reads the three-dimensional graphic data of LOD(1) from the main memory 11 to render the object image on the basis of the displaylist for the frame 1. Since the transfer process to the rendering process of the three-dimensional graphic data of LOD(1) have been completed within the display period of time for one frame, the image derived from the three-dimensional graphic data of LOD(1) is displayed in the frame 1.

Then, the GPU 18 reads the three-dimensional graphic data of LOD(1) from the main memory 11 to render the object image, and also reads the three-dimensional graphic data of LOD(0) from the auxiliary storage device 19 to render the object image, on the basis of the two displaylists for the frame 2. The rendering process of the three-dimensional graphic data of LOD(1) has been completed within the display period of time for one frame, but the rendering process of the three-dimensional graphic data of LOD(0) has not been completed within the display period of time for one frame. The image derived from the three-dimensional graphic data of LOD(0) should be naturally displayed in the frame 2, but cannot be displayed because the rendering process has not been completed. For that reason, the GPU 18 displays the image derived from the three-dimensional graphic data of LOD(1) whose rendering has been completed.

Then, the GPU 18 reads the three-dimensional graphic data of LOD(1) from the main memory 11 to render the object image on the basis of the three-dimensional graphic data of LOD(1) among the two displaylists for the frame 3. Since the rendering process of the three-dimensional graphic data of LOD(0) for the frame 2 is conducted, the three-dimensional graphic data of LOD(0) is not read. Since the rendering process of the three-dimensional graphic data of LOD(1) in the frame 3 has been completed within the display period of time for one frame, and the rendering process of the image derived from the three-dimensional graphic data of LOD(0) for the frame 2 has been completed, at least one of those images can be displayed.

In case of the image derived from the three-dimensional graphic data of LOD (1) for the frame 3, the position of the object image on the screen is accurate, but the simplified object image is displayed.

In case of the image derived from the three-dimensional graphic data of LOD (0) for the frame 2, the detailed object image is displayed, but the position of the object image on the screen is inaccurate. However, there arises no problem because the apparent speed of the object image on the screen is lower.

Also, the image derived from the three-dimensional graphic data of LOD(1) for the frame 3 and the image derived from the three-dimensional graphic data of LOD(0) for the frame 2 may be written in the superimposed manner.

Then, the GPU 18 reads the three-dimensional graphic data of LOD(1) from the main memory 11 to render the object image, and also reads the three-dimensional graphic data of LOD(0) from the auxiliary storage device 19 to render the object image, on the basis of the two displaylists for the frame 4. The rendering process of the three-dimensional graphic data of LOD(1) has been completed within the display period of time for one frame, but the rendering process of the three-dimensional graphic data of LOD(0) has not been completed within the display period of time for one frame. Because the rendering process of the image to be naturally displayed in the frame 4 has not been completed, the GPU 18 displays at least one of the image derived from the three-dimensional graphic data of LOD(1) for the frame 4 and the image derived from the three-dimensional graphic data of LOD(0) for the frame 2, which have been already rendered.

In case of the image derived from the three-dimensional graphic data of LOD (1) for the frame 4, the position of the object image on the screen is accurate, but the simplified object image is displayed.

In case of the image derived from the three-dimensional graphic data of LOD (0) for the frame 2, the detailed object image is displayed, but the position of the object image on the screen is inaccurate. However, there arises no problem because the apparent speed of the object image on the screen is lower.

Also, the image derived from the three-dimensional graphic data of LOD(1) for the frame 4 and the image derived from the three-dimensional graphic data of LOD(0) for the frame 2 may be written in the superimposed manner.

In the case where the object image is displayed as shown in FIG. 12, because the updating cycle of the image derived from the three-dimensional graphic data of LOD(0) and the image derived from the three-dimensional graphic data of LOD(1) changes, the display at the different frame rates within the same image is enabled. For example, in the case where one of two object images within the same image is always displayed by LOD(0), and the other object image is always displayed by LOD(1), those two object images are displayed at the different frame rates.

Also, in the case where the three-dimensional graphic data of LOD(0) and the three-dimensional graphic data of LOD (1) are written in the superimposed manner as described above, the GPU 18 may generate an object image resulting from mixing the object image of LOD(0) and the object image of LOD(1) together at a given ratio to display the mixed object image.

Figure 13:
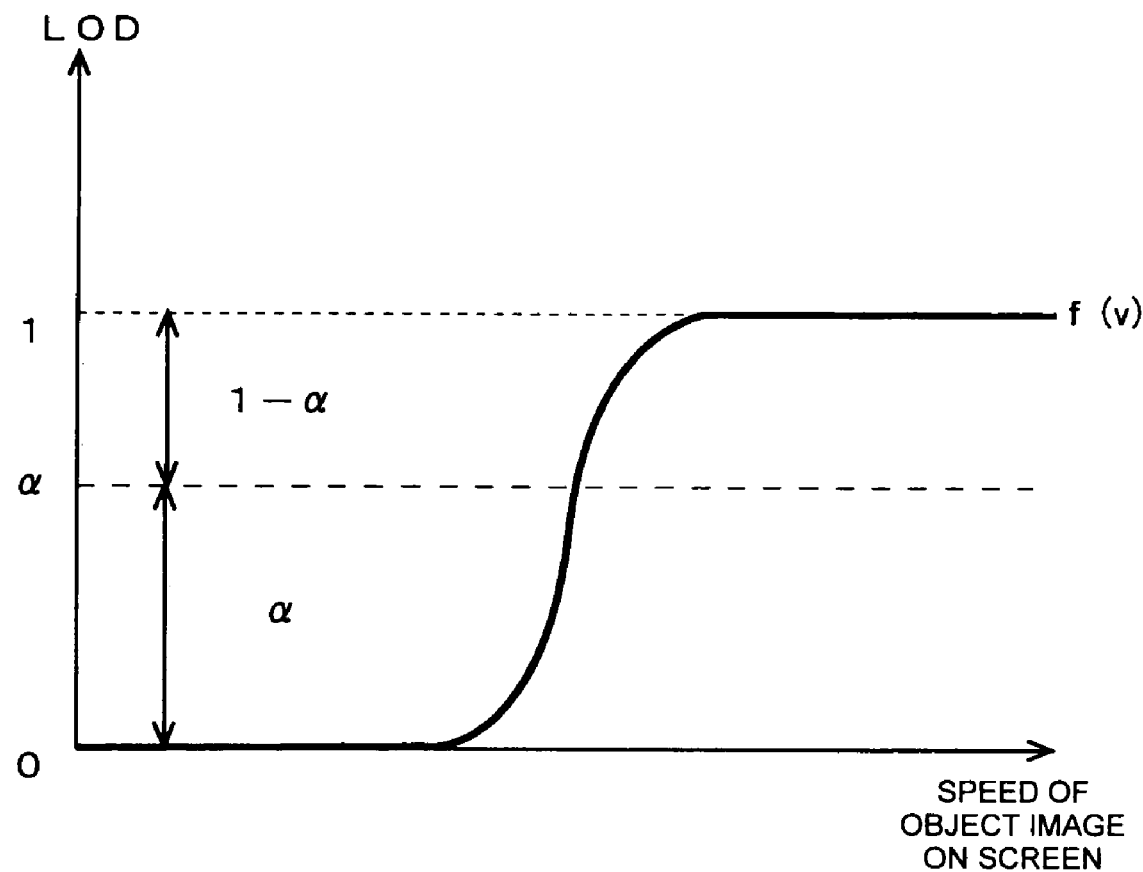
FIG. 13 is a graph showing a function that represents $\alpha$.

For example, assuming that the object image of LOD(0) is G(0), the object image of LOD(i) is G(1) and the mixed object image is G(v), the mixture may be conducted as follows:

$$G(v)=G(0)*(1-\alpha)+G(1)*\alpha$$

where α is expressed by, for example, a function f(v) with the apparent speed of the object image on the screen as a variable as shown in FIG. 13.

In the above description, the LOD level of the three-dimensional graphic data and the texture data is determined on the basis of the apparent speed of the object image on the screen. However, the present invention is not limited to this example, an object image closer to a point of view may be displayed in detail and an object image farther from the point of view may be simplified and displayed by using a distance (Z-value) of the object image from the point of view, or the like. The apparent speed of the object image on the screen, the Z-value or the like is called "attribute of the object image" in the present specification. Both of the apparent speed of the object image on the screen and the distance of the object image from the point of view may be used.

For example, both of the apparent speed of the object image and the distance of the object image from the point of view are evaluated synthetically, the object image whose apparent speed is lower than a given speed and whose distance from the point of view is shorter than a given distance is set as an object image of LOD(0), and the object image that does not satisfy at least one of the above two conditions is set as an object image of LOD(1).

Alternatively, when it is judged on the basis of one of the apparent speed and the distance from the point of view that the object image is of LOD(1) (or LOD(0)), the object image may be determined to LOD(1) (or LOD(0)).

Also, for example, even if the object image farther from the point of view is simplified and displayed regardless of the apparent speed of the object image on the screen because it is far from the point of view, there is no uncomfortable feeling. Therefore, when the object image whose distance from the point of view is equal to or longer than a given distance is set as the three-dimensional graphic data of LOD(1), and the LOD level of the object image whose distance from the point of view is shorter than the given distance is determined on the basis of the apparent speed of the object image on the screen, a processing load for obtaining the apparent speed is reduced.

The image processing apparatus is described in the above-mentioned embodiment, but the present invention is not limited to the above-mentioned embodiment. For example, the present invention can be applied to a case in which a dictionary software is used in an information processing apparatus such as a general-purpose personal computer.

In the dictionary software, simplified data such as a summary (data of LOD(1)) and detailed data (data of LOD (0)) are prepared in each of items to be retrieved, and the data of LOD(1) is stored in the main memory and data of LOD(0) is stored in the auxiliary storage device, respectively. As described above, as compared with the auxiliary storage device, the main memory is normally smaller in the storage capacity and high in the throughput with respect to the output device, and therefore the main memory is suitable to store data that is small in the amount of data and high in the output speed as in the data of LOD(1) therein.

In the above-mentioned information processing apparatus, for example, when a user inspects the respective items of the dictionary software at a high speed, although it is necessary to display the respective items at a high speed, since a period of time during which the user views one item is shorter, the simplified data of LOD(1) is transferred at a high speed and displayed.

On the other hand, in the case where the user inspects the respective items at a low speed, because a period of time during which the user views one item is longer (a period of time for display is longer), it can take a time to acquire the data. For that reason, the data of LOD(0) can be acquired and displayed.

Alternatively, after the data of LOD(1) has been displayed, the data of LOD(0) may be displayed as soon as a preparation is made.

It is possible that the data of LOD(0) and the data of LOD(1) are stored in the auxiliary storage device 19 in advance, and a cache memory is used instead of the main memory 11. None of the data of LOD(0) and the data of LOD(1) is stored in the cache memory when the operation starts, and when the data of LOD(1) is used in fact, the data of LOD(1) is transferred to the cache memory from the auxiliary storage device 19. The data of LOD(1) stored in the cache memory can be used at the subsequent times, but when the data is not used for a given period of time, the data is deleted from the cache memory.

Figure 14:
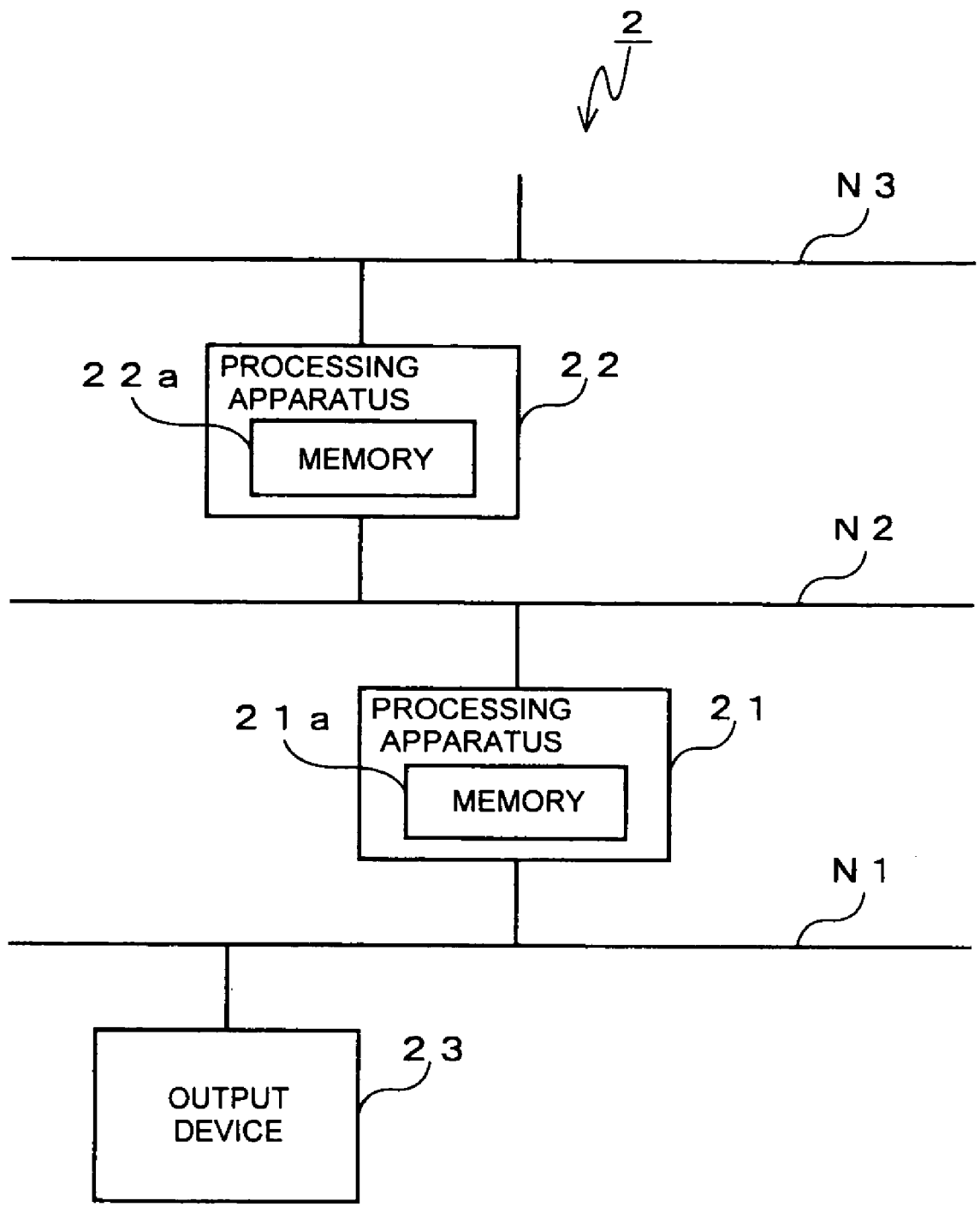
FIG. 14 is a structural diagram showing an image processing system that is structured through a network.

FIG. 14 is an example in which an image processing system 2 is structured by connecting the above-mentioned image processing apparatuses 1 through a LAN (local area network), a WAN (wide area network), a wire such as a public line or a network such as a wireless.

The image processing system 2 is made up of processing apparatuses 21, 22, an output device 23 and networks N1 to N3. The processing apparatus 21 is connected to the output device 23 via the network N1, and connected to the processing apparatus 22 via the network N2. The processing device 22 is connected to the processing device 21 via the network N2, and connected to another processing apparatus not shown via the network N3.

The processing apparatuses 21 and 22 include memories 21a and 22a, respectively. The three-dimensional graphic data of LOD(1) and the texture data of LOD(1) are stored in the memory 21a, and the three-dimensional graphic data of LOD(0) and the texture data of LOD(0) are stored in the memory 22a.

The output device 23 conducts the geometry processing by using the three-dimensional graphic data and the texture data from the processing apparatuses 21 and 22 to generate the displaylist, and generates and outputs the image based on the displaylist, which corresponds to the CPU 10 and the GPU 18 in FIG. 1.

The three-dimensional graphic data and the texture data which are stored in the memory 21a of the processing apparatus 21 are transferred to the output device 23 via the network N1. The three-dimensional graphic data and the texture data which are stored in the memory 22a of the processing apparatus 22 are transferred to the output device 23 via the network N2, the processing apparatus 21 and the network N1.

Because the three-dimensional graphic data and the texture data which are recorded in the respective memories 21a and 22a are transmitted to the output device 23 via the above route, the memory 21a is higher than the memory 22a in a transfer speed of the data to the output device 23.

That is, the relationship between the memories 21a and 22a are identical with the relationship between the main memory 11 and the auxiliary storage device 19 in FIG. 1. When the three-dimensional graphic data of LOD(1) and the texture data of LOD(1) are stored in the memory 21a, and the three-dimensional graphic data of LOD(0) and the texture data of LOD(0) are stored in the memory 22a, the same structure as that of the image processing apparatus shown in FIG. 1 can be realized through the network. Also, it is possible that the above-mentioned information processing apparatus is formed through the above network.

Also, it is possible that both of the data of LOD(0) and the data of LOD(1) are stored in both of the memory 21a and the memory 22a. For example, when the output device is also provided at the network N3 side, the memory 22a is higher than the memory 21a in the transfer speed of the data to the output device, which is contrary to a case of the output device 23 provided at the network N1. However, if both of the data of LOD(0) and the data of LOD(1) are stored in both of the memory 21a and the memory 22a, the data of LOD(0) and the data of LOD(1) can be also transmitted to the output device provided at the network N3 side in accordance with the transfer speed.

Figure 15:
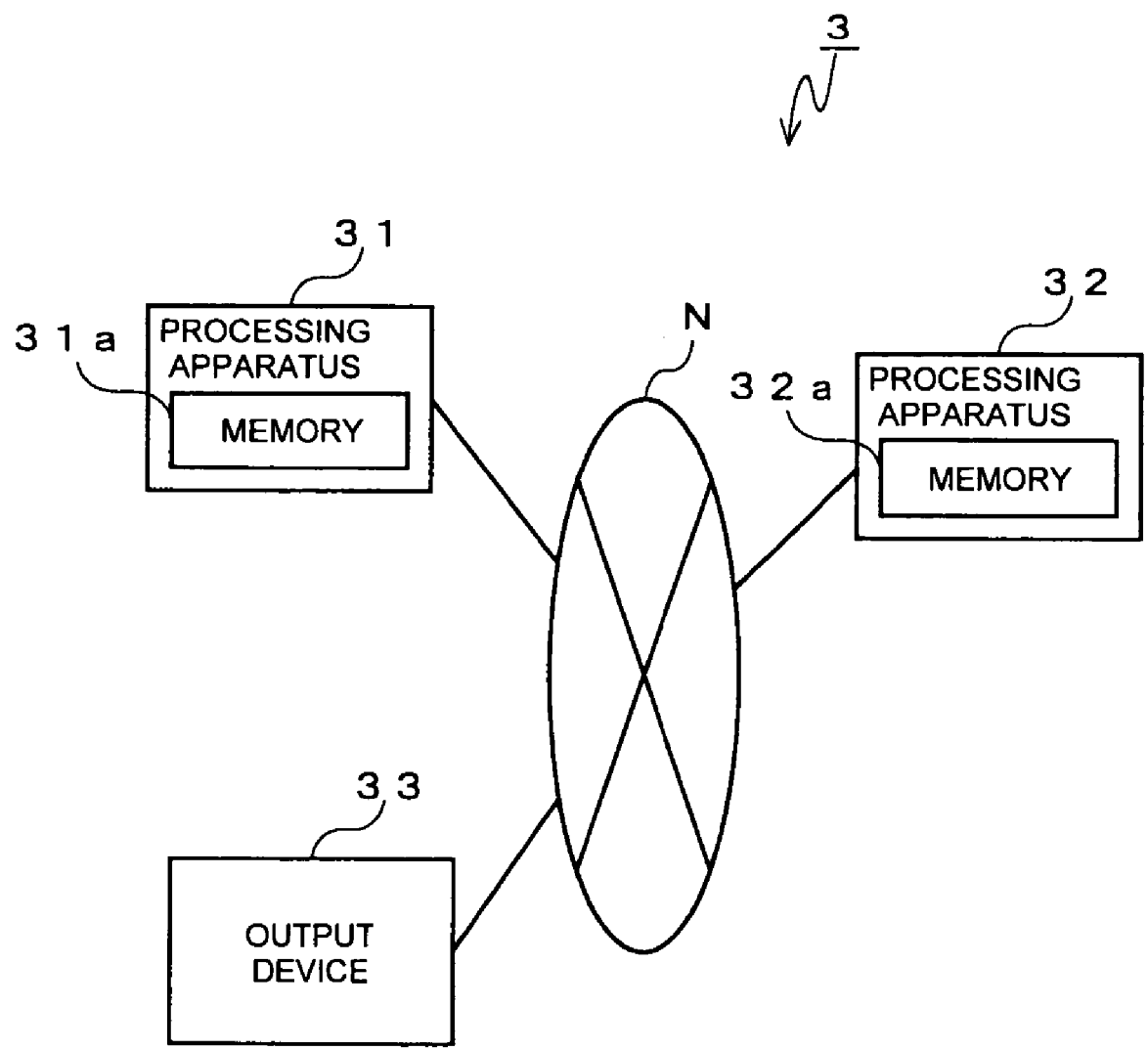
FIG. 15 is a structural diagram showing another image processing system that is structured through a network.

For example, in case of the image processing system 3 in which the processing apparatuses 31, 32 and the output device 33 are connected to the same network N as shown in FIG. 15, it is unclear which transfer speed of the memory 31a built in the processing apparatus 31 and the memory 32a built in the processing apparatus 32 is higher. In this case, a measuring device that measures the transfer speed between the respective processing apparatuses 31 and 32, or the like is connected to the network N, and a memory in which the data of LOD(0) and the data of LOD(1) are allowed to be stored is determined in accordance with the measured result.

In the case where a control unit that controls the operation of the overall image processing system 3 is disposed on the network N, the measuring device is disposed in the control unit so that the transfer speed is measured, and the memory in which the data is stored is determined.

In the above-mentioned description, the LOD levels of the output data (three-dimensional graphic data, texture data and so on) are two kinds, that is, LOD(0) and LOD(1). However, more kinds of LOD levels may be provided.

In this case, for example, memories of the same number as that of LOD levels are stored for storing the LOD levels.

The data which is larger in the n-value of LOD(n) is stored as the throughput from the respective memories to the output device is higher. The data of LOD(0) is stored in the memory that is the lowest in the throughput.

In the case where the memory of the number which is equal to or larger than the number of the LOD levels cannot be prepared, the data of a plurality of LOD levels may be stored in one memory. For example, in the case where data of LOD(0) to LOD(2) is stored in two memories, the data of LOD(0) is stored in a memory that is lower in the throughput, and the data of LOD(2) is stored in a memory that is higher in the throughput. The data of LOD(1) is stored in one of those memories. Also, it is possible that LOD(1) is divided into data that is relatively large in the amount of data and data that is relatively small in the amount of data, and stored in two memories.

Also, the above description is applied to the cases in which a plurality of LOD levels exist. Alternatively, it is possible that one kind of LOD level is set, the data to be outputted is shared to one memory that is higher and another memory that is lower in the throughput to the output device in accordance with whether the object image being to be displayed at a high speed, or not, not depending on the LOD level.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing apparatus that displays a moving image including an object image that represents a virtual object on a given display device, the image processing apparatus comprising:
   a first storage device in which first data that represents the object image is stored;
   a second storage device in which second data that represents the object image which is simplified more than the first data is stored;
   a first processor configured to receive and conduct geometry processing on the first data from the first storage device and on the second data from the second storage device and that conducts geometry processing of the object image by using one of the first data and the second data; and
   a second processor that generates one of images derived from the first data and images derived from the second data in accordance with results of the geometry processing,
   wherein the first processor determines data to be used in the geometry processing to one of the first data and the second data according to an attribute of the object image,
   wherein the second processor takes in the first data from the first storage device to generate the image derived from the first data when the data to be used in the geometry processing which is determined by the first processor is the first data, and takes in the second data from the second storage device to generate the image derived from the second data when the data to be used in the geometry processing which is determined by the first processor is the second data,
   wherein the second storage device can transfer data to the second processor faster than the first storage device,
   wherein the attribute of the object image is an apparent speed of the object image on a screen of the given display device, and
   wherein the first processor determines the data to be used in the geometry processing to the first data when the apparent speed of the object image on the screen is lower than a given speed, and determines the data to be used in the geometry processing to the second data when the apparent speed of the object image on the screen is higher than the given speed.

2. The image processing apparatus as claimed in claim 1, wherein
   the first processor obtains a representative point that moves in conjunction with a motion of the object image as the apparent speed of the object image on the screen.

3. The image processing apparatus as claimed in claim 2, wherein
   the representative point is expressed by average coordinate values of respective points that represent the object image.

4. An image processing apparatus that displays a moving image including an object image that represents a virtual object on a given display device, the image processing apparatus comprising:
   a first storage device in which first data that represents the object image is stored;
   a second storage device in which second data that represents the object image which is simplified more than the first data is stored;
   a first processor configured to receive and conduct geometry processing on the first data from the first storage device and on the second data from the second storage device and that conducts geometry processing of the object image by using one of the first data and the second data; and
   a second processor that generates one of images derived from the first data and images derived from the second data in accordance with results of the geometry processing,
   wherein the first processor determines data to be used in the geometry processing to one of the first data and the second data according to an attribute of the object image,
   wherein the second processor takes in the first data from the first storage device to generate the image derived from the first data when the data to be used in the geometry processing which is determined by the first processor is the first data, and takes in the second data from the second storage device to generate the image derived from the second data when the data to be used in the geometry processing which is determined by the first processor is the second data,
   wherein the second storage device can transfer data to the second processor faster than the first storage device,
   wherein the attribute of the object image is an apparent speed of the object image on the screen and a depth distance from a view point of the object image, and
   wherein the first processor determines the data to be used in the geometry processing to one of the first data and the second data on a basis of a result of comparing the apparent speed of the object image on the screen with a given speed and a result of comparing the depth distance of the object image from the viewpoint with the given distance.

5. An image processing apparatus that displays a moving image including an object image representative of a virtual object on a given display device, the image processing apparatus comprising:

a storage device in which first data that represents the object image and second data that represents the object image which is simplified more than the first data are stored;

a first processor that calculates an apparent speed of the object image on a screen, and conducts geometry processing of the second data when the apparent speed is higher than a given speed, and conducts the geometry processing of the first data and the second data when the apparent speed is lower than the given speed; and a second processor that generates the image derived from the first data and/or the image derived from the second data in accordance with a result of the geometry processing, wherein the second processor displays the image derived from the second data on the given display device in a first case where the apparent speed of the object image on the screen is higher than the given speed, and displays the image derived from the first data on the given display device when a generation of the image derived from the first data has been completed at an updated timing of the moving image and displays at least one of the image derived from the second data and the image derived from the first data of a past frame on the given display device when the generation of the image derived from the first data has not been completed at the updated timing of the moving image in a second case where the apparent speed of the object image on the screen is lower than the given speed, wherein the storage device comprises a first storage device in which the first data is stored, and a second storage device in which the second data is stored, wherein the second storage device can transfer data to the second processor faster than the first storage device, and wherein the first processor is configured to receive and conduct geometry processing on the first data from the first storage device and on the second data from the second storage device.

6. An image processing method which is executed by a apparatus that includes a first storage device in which first data representative of an object image of a virtual object and second data representative of the object image which is more simplified than the first data are stored, a second storage device, a first processor that conducts geometry processing of the first data or the second data, and a second processor that generates one of the image derived from the first data or the image derived from the second data in accordance with the result of the geometry processing conducted by the first processor, for displaying a moving image including the object image on a given display device, the image processing method comprising:

deriving an apparent speed of the object image on a display screen by the first processor;

conducting geometry processing of one of the first data and the second data in accordance with the apparent speed by the first processor;

transferring the second data to the second storage device by the first processor when the geometry processing is conducted on the second data;

taking in the first data from the first storage device to generate the image derived from the first data by the second processor when the geometry processing is conducted on the first data; and taking in the second data from the second storage device to generate the image derived from the second data by the second processor when the geometry processing is conducted on the second data, wherein the second storage device can transfer data to the second processor faster than the first storage device, and wherein the first processor is configured to receive and conduct geometry processing on the first data from the first storage device and on the second data from the second storage device.

* * * * *